Sept. 9, 1958    H. W. STRAUB ET AL    2,851,138
COMBINATION SOLENOID CLUTCH
Filed Oct. 14, 1955

INVENTOR.
HERMANN W. STRAUB,
HUBERT NUSBAUMER,
BY
Parry & Gzesk

ATTORNEYS.

United States Patent Office 2,851,138
Patented Sept. 9, 1958

2,851,138

COMBINATION SOLENOID CLUTCH

Hermann W. Straub and Hubert Nussbaumer, Friedrichshafen, Germany, assignors to I-T-E Circuit Breaker Company, Philadelphia, Pa., a corporation of Pennsylvania Application October 14, 1955, Serial No. 540,569

Claims priority, application Germany May 4, 1955

4 Claims. (Cl. 192—84)

This invention relates to solenoid clutches and more particularly to a clutch specifically constructed so that it may be readily adapted either for friction drive or positive drive by engagement of clutch teeth.

The principal object of the invention is to provide a clutch structure using certain components which may be readily adapted either for operation with friction plates or for operation with positively engageable clutch teeth. A further object of the invention is to provide a compact unit which may be readily disassembled to a limited degree so as to have certain parts interchanged whereby the device may be operated for positive drive or friction drive, as desired. Other objects and features of the invention will be apparent from the disclosure which now follows in conjunction with the drawing, in which:

Briefly, the invention comprises the use of identical solenoids having identical driving rings respectively, which may be readily assembled in conjunction with positive locking teeth for effecting drive or with a friction clutch for effecting drive. Each ring is so devised as to have portions for accommodating radially movable clutch teeth mounted in a novel manner as will presently appear. Each ring is also devised so as to be operable with a friction plate for frictional drive when so desired.

Figure 1:
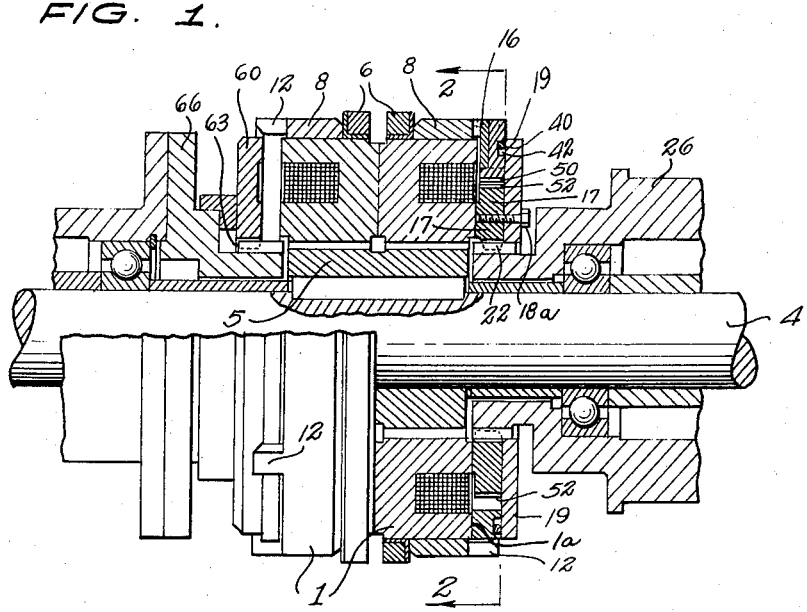
Fig. 1 is a longitudinal view substantially in cross-section.
Figure 2:
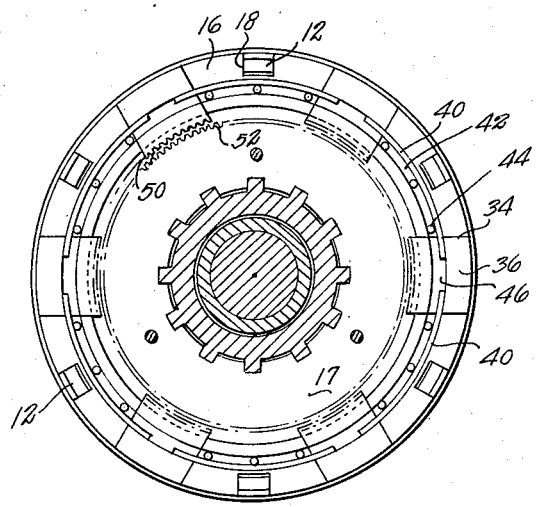
Fig. 2 is a view through section 2—2 of Fig. 1.

In order to illustrate both modes of use of the invention, Fig. 1 shows a type of double clutch, the right side of which has been assembled for positive drive and the left side of which has been assembled for friction drive. Like reference characters are used for identical parts. Thus, two toroidal solenoids, having annular concentric flux paths, each solenoid being designated by the reference character 1 are provided, mounted on and keyed to an intermediate collar 5 which is keyed to a driving shaft 4. The solenoids may be energized through suitably disposed slip rings 6. Carried circumferentially on each of the ring-like solenoids is a driver ring 8 and it will be understood that the driver rings are integrally secured to the respective solenoids. Each driver ring is provided with a series of angularly spaced driver fingers 12 which extend axially therefrom.

Considering first the right hand side of Fig. 1, a ring 16 is provided having suitable slots 18 in which the driver fingers 12 engage. An armature 17 is splined as at 22 to a driven member 26, and has a small degree of axial motion so that it will not "stick" to the de-energized solenoid, a chrome plating on the armature being provided to prevent "sticking." The armature is secured by angularly spaced bolts 18a to a cover plate 19. The bolts protrude to limit the play of the armature, abutting output pulley 26. The cover plate serves to retain certain jaw and spring elements as described below.

On the outward face of ring 16 is provided a series of annularly spaced grooves 34 which reciprocally accommodate respective radially slidable clutch jaws 36 of magnetic material. The jaws 36 are biased outwardly in a radial direction by means of leaf or rod-like springs 40 accommodated in respective grooves 42 milled in the face of the ring 16 and held in place as by wedging pins 44. Thus, each jaw 36 is provided with a registering arcuate groove 46 into which protrudes at either side the end of a leaf spring 40. In this manner it will be understood that each jaw 36 is biased outwardly with respect to the shaft center.

The inner arcuate surface of each of the jaws 36 may be provided with teeth 50 for purposes of engaging with complementarily shaped teeth 52 on the arcuate surface of armature element 17. Thus, it will be apparent that as the jaws 36 move inwardly they will grip armature 17. Rotation of the shaft 4 will effect rotation of the solenoid body and by virtue of the interlocking engagement of the driver fingers 12 with the ring 16 the ring and the clutch jaws 36 will rotate. When the solenoid is energized the flux of the solenoid emanates from its right hand side 1a or face of the solenoid whereby a magnetic force will pull the clutch jaws 36 inwardly to effect engagement with the armature 17 splined to the driven member 26. The armature likewise engages the face of the solenoid to provide some frictional driving force. However, in order to insure release of the armature when the solenoid is de-energized, the armature is preferably plated with a non-ferrous substance such as chrome, as noted above.

Referring now to the left side of Fig. 1, the clutch will be seen to have been arranged for frictional drive by removing the armature 17 together with its clutch jaws 36 and substituting an armature 60 therefor. The armature 60 will be understood to have frictional engagement with the face of the solenoid when attracted thereto. It should be noted that it is readily suited for splined engagement at 63 with the driven member 66.

Having thus described our invention, we are aware that various changes may be made without departing from the spirit thereof and therefore do not seek to be limited to the precise illustration herein given except as set forth in the appended claims.

We claim:

1. A solenoid operated clutch comprising a toroidal solenoid magnet having annular concentric flux paths emanating from one side thereof when energized, an armature comprising a disk-like body having a plurality of clutch teeth on the periphery thereof, a plurality of angularly spaced jaws of magnetic material having teeth engageable with the teeth of said armature, said jaws being coupled to said solenoid magnet and means for supporting said jaws so as to be individually movable radially in unison upon energization of said solenoid magnet so that the teeth thereon engage the teeth on the periphery of said armature and means for effecting torque transmission upon said engagement, said jaws being in the plane of said armature so as to form a portion of the flux circuit through said armature and magnet.

2. A device as set forth in claim 1, in which said means for supporting said jaws comprises a ring, said ring having angularly spaced grooves for receiving a respective jaw of said plurality of jaws, said jaws being radially slidable in their said respective grooves and a plurality of fingers carried by said solenoid magnet engageable with said ring for rotation thereof with said magnet.

3. A device as set forth in claim 2, including resilient elements carried by said ring and engaging said jaws for biasing said jaws out of engagement with said armature, said resilient elements comprising elongated flexible members angularly spaced intermediate said jaws and engaging said jaws so as to bias them radially outward.

4. In a device as set forth in claim 2, said one side of said magnet being adapted to be engageable by said armature which comprises a frictional disk.

References Cited in the file of this patent

FOREIGN PATENTS

| | | |
|---|---|---|
| 441,030 | France | May 17, 1912 |
| 480,928 | Germany | Aug. 10, 1929 |